US012712883B2

(12) United States Patent
Surcouf et al.

(10) Patent No.: US 12,712,883 B2
(45) Date of Patent: Aug. 18, 2026

(54) MANAGING EDGE APPLICATION PERMISSIONS

(71) Applicant: Cisco Technology, Inc., San Jose, CA (US)

(72) Inventors: Andre Jean Marie Surcouf, Saint Leu la Foret (FR); Trevor Adam Whinmill, Nuneaton (GB); Benjamin William Ryder, Lausanne (CH); Pablo Garcia del Valle, Chavannes-pres-Renens (CH)

(73) Assignee: Cisco Technology, Inc., San Jose, CA (US)

( * ) Notice: Subject to any disclaimer, the term of this patent is extended or adjusted under 35 U.S.C. 154(b) by 253 days.

(21) Appl. No.: 18/366,924

(22) Filed: Aug. 8, 2023

(65) Prior Publication Data

US 2025/0055854 A1 Feb. 13, 2025

(51) Int. Cl.
*H04L 9/40* (2022.01)

(52) U.S. Cl.
CPC ............ *H04L 63/105* (2013.01); *H04L 63/20* (2013.01)

(58) Field of Classification Search
CPC .............................. H04L 63/105; H04L 63/20
USPC .............................................................. 726/1
See application file for complete search history.

(56) References Cited

U.S. PATENT DOCUMENTS

2021/0173919 A1 6/2021 Kolishchak
2022/0103593 A1 3/2022 Singh et al.
2022/0215111 A1 7/2022 Ekins
2022/0222337 A1 7/2022 Doshi et al.
2022/0255941 A1 8/2022 Sienicki et al.
2022/0342997 A1 10/2022 Watanabe et al.
2022/0385647 A1* 12/2022 Pabón ..................... H04L 63/08
2023/0344899 A1* 10/2023 Zhu ..................... H04L 67/1008
2024/0061751 A1* 2/2024 Janarthanam ....... G06F 11/2097

* cited by examiner

*Primary Examiner* — Aubrey H Wyszynski
(74) *Attorney, Agent, or Firm* — Baker Botts L.L.P.

(57) ABSTRACT

In one embodiment, a method may access a first description of a plurality of edge applications and a cluster level security policy on an edge site of an Internet of Things (IoT) network. The method may receive a second description of a storage related operation associated with an edge application to be deployed on the edge site. The method may determine a permission level for the storage related operation based on the first and second descriptions. The method may determine, using the cluster level security policy and the permission level, an updated cluster level security policy. In response to determining the permission level is privileged, the method may perform, using a first secure agent, an edge cluster, and the updated clustered level security policy, the storage related operation associated with the edge application on the edge site of the IoT network.

20 Claims, 5 Drawing Sheets

Storage Class Configuration 302

Storage Class Object Definition 304

```
displayName: Video processor
description: Video processing tools
icon: https://get.greatbear.io/pub/images/videoproc/logo.png

# Defines whether the app can be deployed to the same site several times
singleton: true
# Array of application configuration options
# See openapi.yaml/components/schemas/ApplicationParameter

configuration:
 - name: INPUT1
   title: The RTSP stream to use as input
   value: "rtsp://camera1:8554/live"
   type: String
- name: INPUT2
   title: The RTSP stream to use as input
   value: "rtsp://camera2:8554/live"
   type: String
- name: ARCHITECTURE
   title: Choose between the ARM and x86 version of the app
   value: "arm"
   choices: ["arm", "x86"]

storage:
  kind: StorageClass
  apiVersion: storage.k8s.io/v1
  metadata:
    name: images-store
  provisioner: driver.longhorn.io
  allowVolumeExpansion: true
  parameters:
    numberOfReplicas: "2"
    dataLocality: "best-effort"
    staleReplicaTimeout: "2880" # 48 hours in minutes
    fromBackup: ""
```

FIG. 3

MANAGING EDGE APPLICATION PERMISSIONS

TECHNICAL FIELD

The present disclosure relates generally to edge applications for a Kubernetes® based distributed edge computing process, and more particularly, to determining a storage related privileged operation for a Kubernetes® application in an Internet of Things (IoT) network.

BACKGROUND

Distributed edge computing is increasingly becoming a standard architecture for many uses cases, especially those that involve time-sensitive data. The distributed edge computing is a decentralized information technology (IT) architecture in which the computing resources, such as servers, computing nodes, storage devices, and network equipment, are deployed at the edge of the network close to a user equipment, near an originating source, such as an IoT device. For example, the distributed edge computing may process the data, such as workloads, closer to where the data originates. As another example, the distributed edge computing may improve bandwidth efficiency for a large amount of data from edge applications of a plurality of IoT devices which are usually close to the edge of the network.

Kubernetes® based distributed edge computing system provides a plurality of container-based IoT applications in an edge computing environment. The Kubernetes® applications may use autoscaling to dynamically adapt to fluctuations in IoT device requests. For example, the Kubernetes® applications may monitor resource status of computing nodes to perform resource autoscaling for a plurality of IoT applications in the edge computing environment. As another example, the Kubernetes® based distributed edge computing system may perform upscaling and downscaling actions based on network traffic information from the computing nodes to improve the quality of IoT services in the edge computing environment.

Kubernetes® is a portable, extensive, and open source orchestration system for automating deployment, scaling, and management of containerized applications. A Kubernetes® application may include one or more containers, storage resources, a unique network Internet Protocol (IP) address, and options which govern how the one or more containers would execute. Especially, a Kubernetes® container is a lightweight and portable executable image that contains software and all of its dependencies. For example, the one or more containers may decouple containerized applications from underlying host infrastructure, such as hardware, operating system, etc., to use one or more Kubernetes® container runtimes. As another example, a Kubernetes® cluster may serve as a basic Kubernetes® architecture for a central nervous system orchestrating applications and running pods as defined by users. Thus, the one or more containers may run in a pod and house the Kubernetes® cluster to make deployment easier in different cloud or operating system (OS) environments, and for easier scaling.

A pod is the smallest execution unit of a Kubernetes® application that runs a single instance of the Kubernetes® application. The one or more containers in the pod are automatically co-located and co-scheduled on the same physical or virtual machine in the Kubernetes® cluster. Thus, the one or more containers share resources including networking and storage resources. For example, the pod may specify a set of shared storage volumes that are accessible to the one or more containers in the pod. In particular, the pod is assigned a unique IP address and every container in the pod shares the network namespace, including the IP address and network ports. Because the pod encapsulates one or more applications, it is possible to use multiple pods to scale the Kubernetes® application. As a result, the Kubernetes® orchestration system may define a plurality of primitives to collectively provide mechanisms to deploy, maintain, and scale applications, such as workloads, on different computing nodes based on central processing unit (CPU), memory, or custom metrics. However, it is necessary to deploy a plurality of Kubernetes® applications that require privilege operations. For example, the Kubernetes® orchestration system may run a Kubernetes® application to perform a critical mission that needs to extend an existing resource type available in an edge cluster on an edge site. The operation of extending the existing resource type might potentially crash other Kubernetes® applications running in the same edge cluster. Therefore, it is desired to develop a mechanism to perform the plurality of Kubernetes® applications using privilege operations to avoid conflicts with other Kubernetes® applications running in the same edge cluster.

BRIEF DESCRIPTION OF THE DRAWINGS

FIG. 3 illustrates an example Kubernetes® storage class for applications running on a Kubernetes® cluster.

DESCRIPTION OF EXAMPLE EMBODIMENTS

Overview

Figure 1:
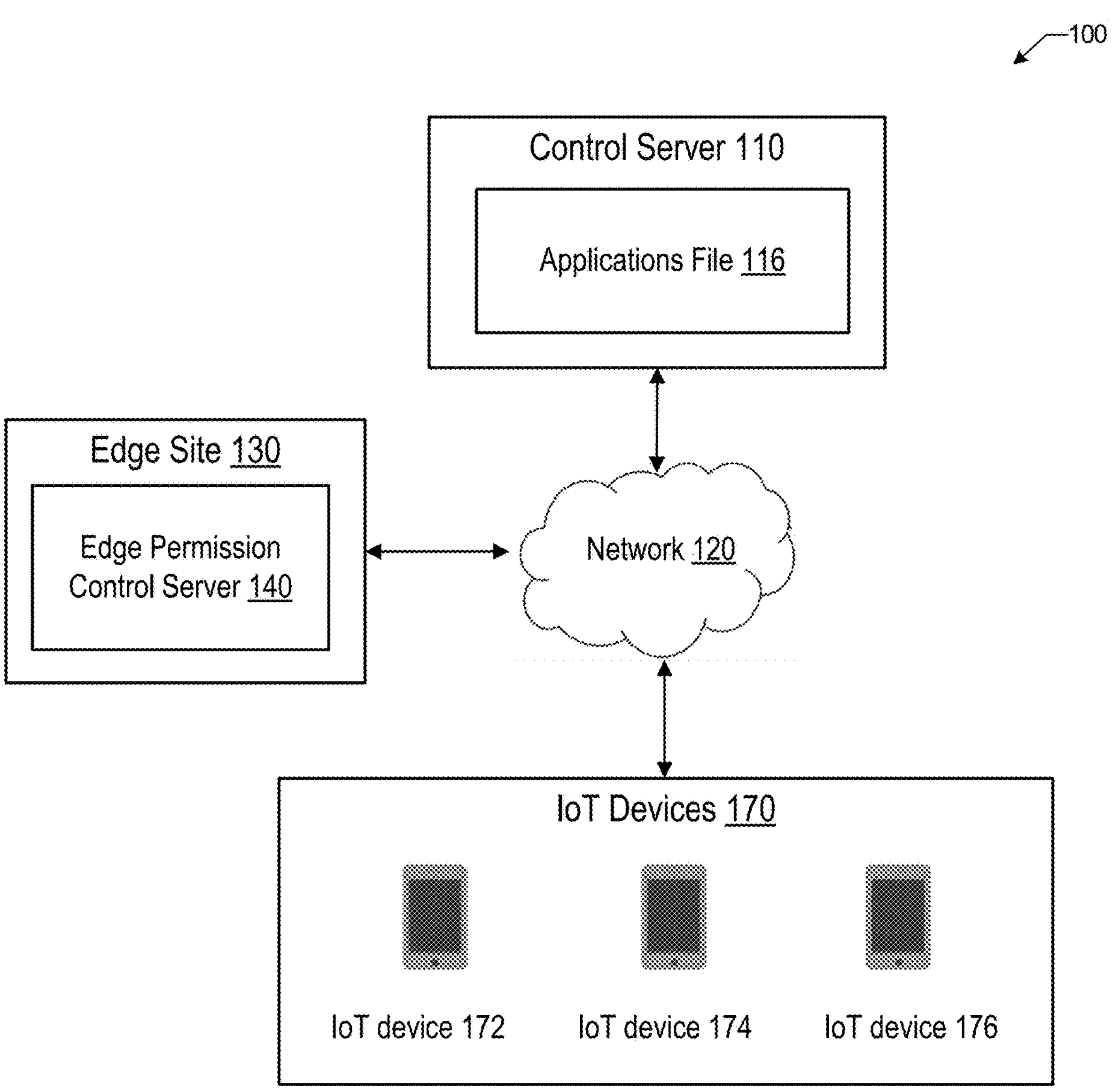
FIG. 1 illustrates an example application privilege control system for use in a product.

In one or more embodiments, an apparatus may comprise one or more processors, and one or more computer-readable non-transitory storage media coupled the to one or more of the processors. The one or more computer-readable non-transitory storage media may comprise instructions operable when executed by one or more of the processors to cause one or more components of the apparatus to perform operations to access a first description of a plurality of edge applications and a cluster level security policy. The plurality of edge applications and the cluster level security policy are deployed on an edge site of an IoT network. The apparatus is configured to receive a second description of a storage related operation associated with an edge application to be deployed on the edge site. The apparatus is configured to determine a permission level associated with the storage related operation based on the first description and the second description. The apparatus is configured to determine, using the cluster level security policy and the permission level associated with the storage related operation, an updated cluster level security policy. In response to determining the permission level is privileged, the apparatus is configured to perform, using a first secure agent, an edge cluster, and the updated clustered level security policy, the storage related operation associated with the edge application on the edge site of the IoT network.

In one or more embodiments, a method, by an apparatus, may access a first description of a plurality of edge applications and a cluster level security policy. The plurality of edge applications and the cluster level security policy are deployed on an edge site of an IoT network. The method may receive a second description of a storage related operation associated with an edge application to be deployed on the edge site. The method may determine a permission level associated with the storage related operation based on the first description and the second description. The method may determine, using the cluster level security policy and the permission level associated with the storage related operation, an updated cluster level security policy. In response to determining the permission level is privileged, the method may perform, using a first secure agent, an edge cluster, and the updated clustered level security policy, the storage related operation associated with the edge application on the edge site of the IoT network.

In one or more embodiments, one or more computer-readable non-transitory storage media may embody software that is operable, when executed by a processor, to access a first description of a plurality of edge applications and a cluster level security policy. The plurality of edge applications and the cluster level security policy are deployed on an edge site of an IoT network. The software may be further operable, when executed, to receive a second description of a storage related operation associated with an edge application to be deployed on the edge site. The software may be further operable, when executed, to determine a permission level associated with the storage related operation based on the first description and the second description. The software may be further operable, when executed, to determine, using the cluster level security policy and the permission level associated with the storage related operation, an updated cluster level security policy. In response to determining the permission level is privileged. The software may be further operable, when executed, to perform, using a first secure agent, an edge cluster, and the updated clustered level security policy, the storage related operation associated with the edge application on the edge site of the IoT network.

Technical advantages of certain embodiments of this disclosure may include one or more of the following. Certain apparatus and methods described herein may determine a permission level associated with a storage related privileged operation. The apparatus and the method may use the permission level to isolate a description of a plurality of privileged operations required to deploy an edge operation. The apparatus and the method may use the permission level to extend one or more existing resource types available in the edge cluster of the edge site of the IoT network. The apparatus and the method may delegate the execution of the plurality of privileged operations to a special secure agent.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

In general, distributed edge computing is increasingly becoming a standard IoT architecture for data processing and data storage closer to where the data originates. In particular, the distributed edge computing provides a different paradigm from the cloud computing to improve response time and bandwidth efficiency. Millions of devices may at different edge sites of the IoT network include one or more edge applications to produce a massive amount of sensor data. For example, the distributed edge computing may deploy edge nodes decentralized at edge sites close to the edge applications. Because of the proximity in geographical locations between adjacent edge nodes and the use of high speed network connections, the distributed edge computing may obtain real-time task offloading and resource allocation using computing resources of adjacent edge nodes for the real-time analysis of the sensor data. As another example, a hybrid model of the distributed edge computing and the cloud computer is also possible, whereby some processing is done at the edge and other processing takes place in the cloud. Therefore, the distributed edge computing may provide an optimized reasonability and balance of edge node cluster resources use among edge computing nodes.

In an embodiment, Kubernetes® based distributed edge computing may require privileges when performing one or more Kubernetes® operations on an edge site of an IoT network. In particular, there are many storage related issues when performing the one or more Kubernetes® operations on the edge site for distributed edge computing. For example, when an edge application needs to extend existing resource types available in a Kubernetes® cluster, such as new storage class types and correlating provisioner configuration. This extension may lead to issues when the one or more Kubernetes® applications are performed on the same Kubernetes® cluster and when some of the one or more Kubernetes® application are mission critical. As another example, if a Kubernetes® application requires privileges to be deployed on the edge site, the deployment of the edge application may potentially break things inside the edge site that may potentially crash other edge applications already deployed on the same edge site. Traditional traits systems do not use privileges to perform Kubernetes® operations to deploy an edge application on the edge site. For example, Open Application Model (OAM) traits system is a discretionary runtime overlay that identifies already deployed functions without making any assumption on how they are deployed or configured. The OAM traits system represents an application operator role, such as a database, gateway, etc., which applies a runtime and manages operational behaviors for instances of components through traits. In particular, the OAM traits system may make specific decisions about the configuration of components, without having to involve the component provider or breaking the component encapsulation. As another example. KubeVela system is an OAM partial implementation but does not provide any traits either. The Kube Vela system rather assumes there is an agent running where applications would be deployed which implements the traits the application would use. Therefore, it is very desired to develop an edge permission control server to determine a permission level for a Kubernetes® operation associated with an edge application in a distributed edge computing environment. The edge permission control system may use the permission level to identify a privileged operation from a plurality of Kubernetes® operations associated with the edge application, which needs to be deployed for distributed edge computing. For the privileged operation, the edge permission control system may be configured to generate a security context to define privileges and access control settings for a pod or a container. Furthermore, the edge permission control system may generate a description of the plurality of Kubernetes® operations, typically in Yet Another Markup Language (YAML) format, which include privileges regarding when to disseminate workloads, such as in the Helm chart used to deploy the plurality of Kubernetes® applications at the edge site.

FIG. 1 illustrates an example application privilege control system 100 for use in a product. The application privilege control system 100 may be configured to determine a plurality of privileged operations associated with an edge application to be performed on an edge site in an IoT network. In particular, the application privilege control system 100 may be a Kubernetes® based distributed edge computing system to determine a permission level for a storage related privileged Kubernetes® operation associated with the edge application to be performed on the edge site in the IoT network. In an embodiment, the application privilege control system 100 may include a control server 110, a network 120, an edge site 130, and a plurality of IoT devices 170. The control server 110 may be configured to perform as a control plane. In particular, the control server 110 may be configured to receive an application file 116 to interpret a description of a plurality of edge applications to deploy. The control server 110 may be communicatively coupled to network 120 to routinely collect large amounts of data packets from a plurality of edge applications associated with IoT devices operating in real time in the IoT network. Instead of transmitting the data packets to a centralized data center for processing and analysis, the application privilege control system 100 may be configured to perform the work near the edge site 130 where the data packets are actually generated.

Network 120 broadly represents any wireline or wireless network, using any of satellite or terrestrial network links, such as public or private cloud on the Internet, local area networks (LANs), metropolitan area networks (MANs), wide area networks (WANs), a public switched telephone network (PSTN), campus network, internetworks, or combinations thereof. The network 120 may include or comprise the public internet and networked server computers that implement Web2 and/or Web3 technologies. The network 120 may comprise or support intranets, extranets, or virtual private networks (VPNs). The network 120 may also comprise a public switched telephone network (PSTN) using digital switches and call forwarding gear. The network 120 may also comprise a public switched telephone network (PSTN) using digital switches and call forwarding gear.

In an embodiment, the application file 116 may use a classical Helm standard to automate the creation, packaging, configuration, and deployment of the one or more Kubernetes® applications by combining configurations into a single reusable package. In particular, the application file 116 may extend the classical Helm standard by adding a special section in the YAML format for the control server 110 to interpret the plurality of edge applications. For example, the special section of the application file 116 may include metadata to describe one or more privileged operations. Thus, the application privilege control system 100 may perform a plurality of operations in an interception process to deploy an edge application on the edge site 130. For example, the application privilege control system 100 is configured to pass the application file 116 to the control server 110 to extract the metadata section of the application file 116. Upon the receipt of the application file 116, the control server 110 may analyze the metadata section in the application file 116. If the metadata section contains a description of one or more privileged operations, the control server 110 may validate the one or more privileged operations. In response to determining the one or more privileged operations are authorized, the control server 110 may transfer the application file 116 to the edge site 130. In response to determining the one or more privileged operations are not authorized, the control server 110 may return an error.

In an embodiment, the edge site 130 may include an edge permission control server 140 to determine a permission level using information of the metadata section in the application file 116 from the control server 110. The edge permission control server 140 is configured to determine a permission level for each of the plurality of operations in the application file 116. The edge permission control server 140 may use the permission level to identify a privileged operation from the plurality of operations that need to be deployed for the distributed edge computing. For the privileged operation, the edge permission control server 140 may generate a security context to define privileges and access control settings for a pod or a container to perform the privileged operation associated with the plurality of edge applications for multiple IoT devices 170.

In an embodiment, the control server 110 may reside close to the edge site 130 within the IoT network where the router agents and edge applications generate the data packets. The control server 110 may be configured to support eventually consistent application processing interface (API) calls. For example, the control server 110 may determine how data packets from a plurality of edge applications for multiple IoT devices 170, such as IoT device 172, IoT device 174, and IoT device 176, may be stored and processed locally within the IoT network. As another example, the control server 110 may determine how the data packets from the plurality of edge applications are to be exposed to one or more APIs. In particular, the control server 110 may obscure or secure any sensitive data in the collected data packets from the plurality of edge applications before forwarding the collected data packets from one place to another place, such as a cloud or a primary data center, within the IoT network. Therefore, the control server 110 may balance the API calls associated with the plurality of edge applications for various IoT devices.

Figure 2:
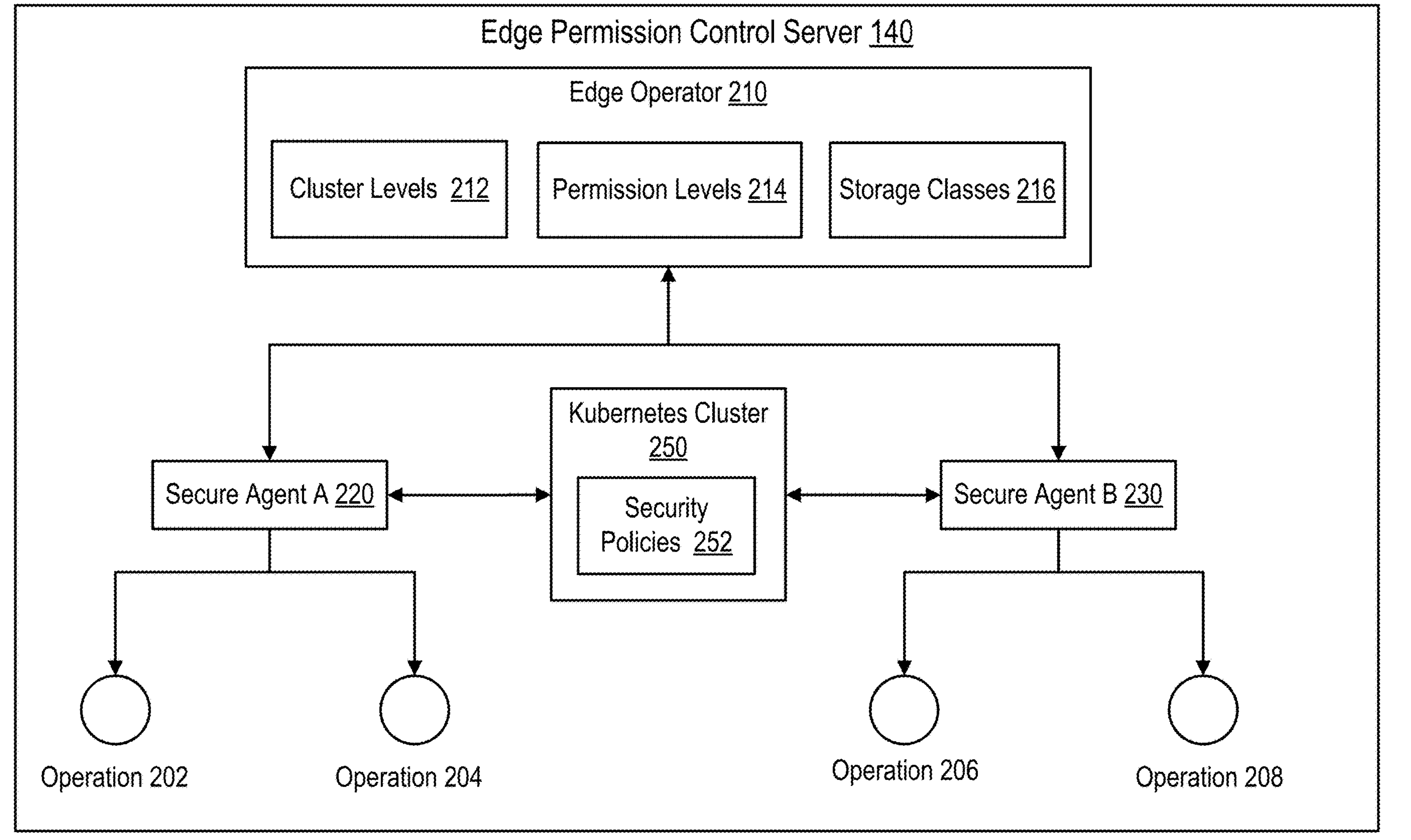
FIG. 2 illustrates an example edge permission control server.

FIG. 2 illustrates an example edge permission control server 140. In an embodiment, the edge permission control server 140 may include an edge operator 210, one or more secure agents, such as secure agent A 220 and secure agent B 230, and a Kubernetes® cluster 250. The edge operator 210 is configured to determine permission levels 214 for a plurality of Kubernetes® operations, such as operation 202, operation 204, operation 206, and operation 208, when an edge application is deployed. In particular, the edge operator 210 may limit the privileges of pods and corresponding inner containers to ensure that the pods run with well-controlled privileges. The edge operator 210 may use the permission levels to define different cluster level security policies 252 to deploy the plurality of Kubernetes® operations on the Kubernetes® cluster 250. For example, the edge operator 210 may use three different security policies that are consistent with pod security standards: privileged, baseline, and restricted. A privileged operation has an unrestricted policy that allows for known privilege escalations and provides the widest possible level of permissions. A baseline operation uses a minimally restrictive policy that prevents known privilege escalations. A restricted operation uses a heavily restricted policy that follows a current pod hardening best practice. The edge operator 210 may update the cluster levels 212 and the permission levels 214 for the plurality of operations for critical and non-critical edge applications.

In an embodiment, the edge permission control server 140 may be configured to use Kubernetes® to run Linux® operations. For example, the edge permission control server 140 may use computing nodes that run Linux® in the Kubernetes® cluster 250. Thus, the edge permission control server 140 may determine a plurality of privileged operations, such as Longhorn StorageClass and Persistent Volumes (PV) creation or deletion, which involve underlying Linux® operations. To perform such privileged operations, the pod requires its security context to set a true value for a privileged operation, such as allowPrivilegeEscalation: true. However, there are some issues to creating conflicts that provide excessive privileges to the pod to affect other edge applications running on the same edge site, such as deleting an existing storage class which may affect other edge applications running on the same edge site. These conflicts may potentially affect the plurality of edge applications running simultaneously on the same edge site. An example of the security context may be found in Table. 1 below.

TABLE 1

An example of security context.

| Context Item | Value |
| --- | --- |
| apiVersion: | v1 |
| kind: | Pod |
| metadata: | |
| name: | security-context-demo-2 |
| spec: | |
| securityContext: | |
| runAsUser: | 1000 |
| containers: | |
| name: | sec-ctx-demo-2 |
| image: | gcr.io/google-samples/node-hello:1.0 |
| securityContext: | |
| runAsUser: | 2000 |
| allowPrivilegeEscalation: | true |

In an embodiment, the edge permission control server 140 may be configured to apply a two-step process to solve the conflict of providing enough privileges to the pod: 1) isolate a description of a plurality of privileged operations required to deploy an edge application, and 2) delegate an execution of the plurality of privileged operations to a special secure agent. When the edge permission control server 140 receives the application file 116 and runtime parameters from the control server 110, the edge operator 210 may determine permission levels 214 for a plurality of Kubernetes® operations associated with an edge application to deploy on the edge site 130 using the metadata section in the application file 116 and the runtime parameters. In particular, the metadata section includes a description of the plurality of privileged operations associated with the edge application to deploy on the edge site 130. Likewise, the edge operator 210 may determine a storage configuration policy that includes one or more new storage class types, such as storage classes 216, and a correlating provisioner configuration. For example, the storage classes 216 may include a Longhorn StorageClass. As another example, the correlating provisioner configuration is a predetermined provisioner configuration, such as driver.longhorn.io.

In an embodiment, the edge permission control server 140 may be configured to determine cluster levels 212 for the plurality of Kubernetes® operations associated with the edge application to deploy on the edge site 130. In particular, the edge operator 210 may determine a cluster level for each of the plurality of Kubernetes® operations associated with the edge application. As a result, the edge permission control server 140 may use the cluster levels 212, the permission levels 214, and the storage classes 216 to determine the cluster level security policies 252 for the Kubernetes® cluster 250. The cluster level security policies 252 may provide enough privileges to the pod for the plurality of privileged operations without affecting other edge application running on the same edge site.

In an embodiment, the edge permission control server 140 may be configured to send the plurality of privileged operations, such as operation 202 and operation 204, to a first secure agent, such as secure agent A 220. In an embodiment, the edge permission control server 140 may be configured to send other operations, such as operation 206 and operation 208, to a second secure agent, such as secure agent B 230. Thus, the edge operator 210 may provide proper privileges to perform the privileged operations described in the metadata section of the application file 116. In particular, the edge operator 210 may create persistent volume or Storage Class on behalf the edge application without requiring the edge application to have any privileges. Likewise, the edge permission control server 140 may manage different application privileges in the distributed edge computing environment in which multiple edge applications are executed in the same Kubernetes® cluster without requiring the edge applications to have any privileges.

Although FIG. 2 describes and illustrates particular components, devices, or systems carrying out particular actions, this disclosure contemplates any suitable combination of any suitable components, devices, or systems carrying out any suitable actions.

FIG. 3 illustrates an example Kubernetes® storage class for applications running on a Kubernetes® cluster. The Kubernetes® storage class may include a storage class configuration 302 and a storage class object definition 304. The storage class configuration 302 includes a plurality of configuration parameters, such as names, titles, values, types, and choices, for Kubernetes® storage classes used in a Kubernetes® operation. The storage class object definition 304 includes a plurality of object parameters to define a storage class object. The edge permission control server 140 may use the storage class configuration 302 and the storage class object definition 304 to perform a storage related privileged operation on behalf of the edge application being deployed. An example of the storage class object may be found in Table 2 below.

TABLE 2

An example of the storage class object

| Object Item | Description | Value |
| --- | --- | --- |
| kind | API object type | StorageClass |
| apiVersion | Current apiVersion | storage.k8s.io/v1 |
| name | Name of the storage class | images-store |
| provisioner | type of provisioner associated with this storage class | driver.longhorn.io |
| allowVolumeExpansion | Flag to support volume expansion | true |
| numberofReplicas | The number of replicas created for each volume | 2 |
| dataLocality | Schedule at least a replica on the same node | best-efforts |
| staleReplicaTimeout | Time to cleanup an error replica | 2880 |

Figure 4:
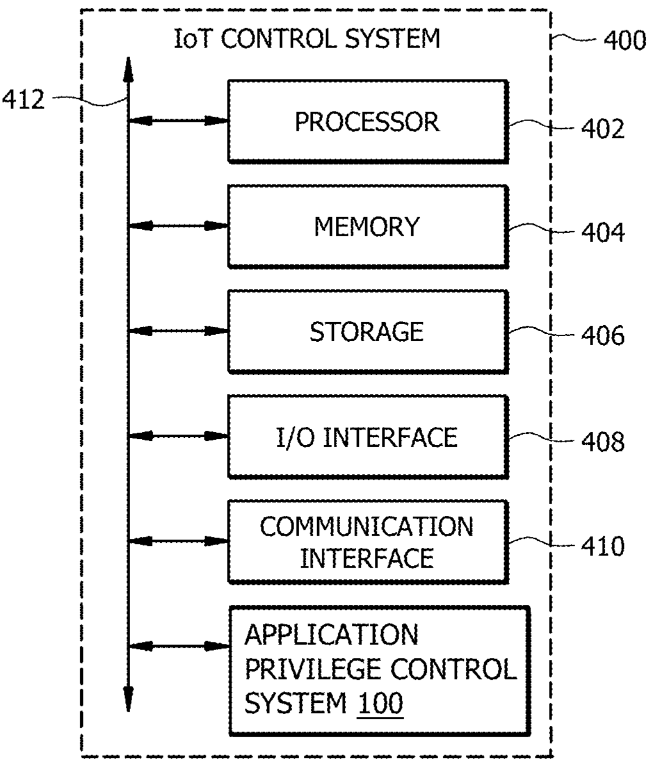
FIG. 4 illustrates an example IoT control system.

FIG. 4 illustrates an example IoT control system 400. In particular embodiments, one or more IoT control systems 400 perform one or more steps of one or more methods described or illustrated herein. In particular embodiments, one or more IoT control systems 400 provide functionality described or illustrated herein. In particular embodiments, software running on one or more IoT control systems 400 performs one or more steps of one or more methods described or illustrated herein or provides functionality described or illustrated herein. Particular embodiments include one or more portions of one or more IoT control systems 400. Herein, reference to an information handling system may encompass a computer or a computing device, and vice versa, where appropriate. Moreover, reference to an information handling system may encompass one or more computer systems, where appropriate. Further, the application privilege control system 100 in FIG. 1 may be incorporated into the illustrated IoT control system 400. With reference to the present disclosure, the IoT control system 400 may be the aforementioned product incorporating application privilege control system 100, as described above with respect to FIG. 1. As such, "product" and "IoT control system 400" may herein be used interchangeably.

This disclosure contemplates any suitable number of IoT control systems 400. This disclosure contemplates IoT control system 400 taking any suitable physical form. As example and not by way of limitation, IoT control system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, IoT control system 400 may include one or more IoT control systems 400; be unitary or distributed; span multiple locations; span multiple machines; span multiple data centers; or reside in a cloud, which may include one or more cloud components in one or more networks. Where appropriate, one or more IoT control systems 400 may perform without substantial spatial or temporal limitation one or more steps of one or more methods described or illustrated herein. As an example and not by way of limitation, one or more IoT control systems 400 may perform in real time or in batch mode one or more steps of one or more methods described or illustrated herein. One or more IoT control systems 400 may perform at different times or at different locations one or more steps of one or more methods described or illustrated herein, where appropriate.

In particular embodiments, IoT control system 400 includes a processor 402, memory 404, storage 406, an input/output (I/O) interface 408, a communication interface 410, and a bus 412. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, IoT control system 400 may load instructions from storage 406 or another source (such as, for example, another IoT control system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to IoT control system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), crasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between IoT control system 400 and one or more I/O devices. IoT control system 400 may include one or more of these I/O devices, where appropriate. One or more of these I/O devices may enable communication between a person and IoT control system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between IoT control system 400 and one or more other IoT control systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, IoT control system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, IoT control system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. IoT control system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of IoT control system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In an embodiment, IoT control system 400 may be configured to initiate a Kubernetes® based distributed edge computing process (see FIG. 5) in order to determine a permission level for a storage related operation associated with an edge application to be deployed on an edge site of an IoT network. In an embodiment, IoT control system 400 may be configured to access a first description of a plurality of edge applications and a cluster level security policy. The plurality of edge applications and the cluster level security policy are deployed on the edge site of the IoT network. In an embodiment, IoT control system 400 may be configured to receive a second description of a storage related privileged operation associated with an edge application to be deployed at the edge site. In an embodiment, IoT control system 400 may be configured to determine a permission level associated with the storage related privileged operation based on the first description and the second description. In an embodiment, IoT control system 400 may be configured to determine, using the cluster level security policy and the permission level associated with storage related privileged operation, an updated cluster level security policy. In an embodiment, in response to determining the permission level is privileged, IoT control system 400 may be configured to perform, using a first secure agent and the updated clustered level security policy, the storage related privileged operation associated with the edge application on an edge cluster of the edge site of the IoT network.

Figure 5:
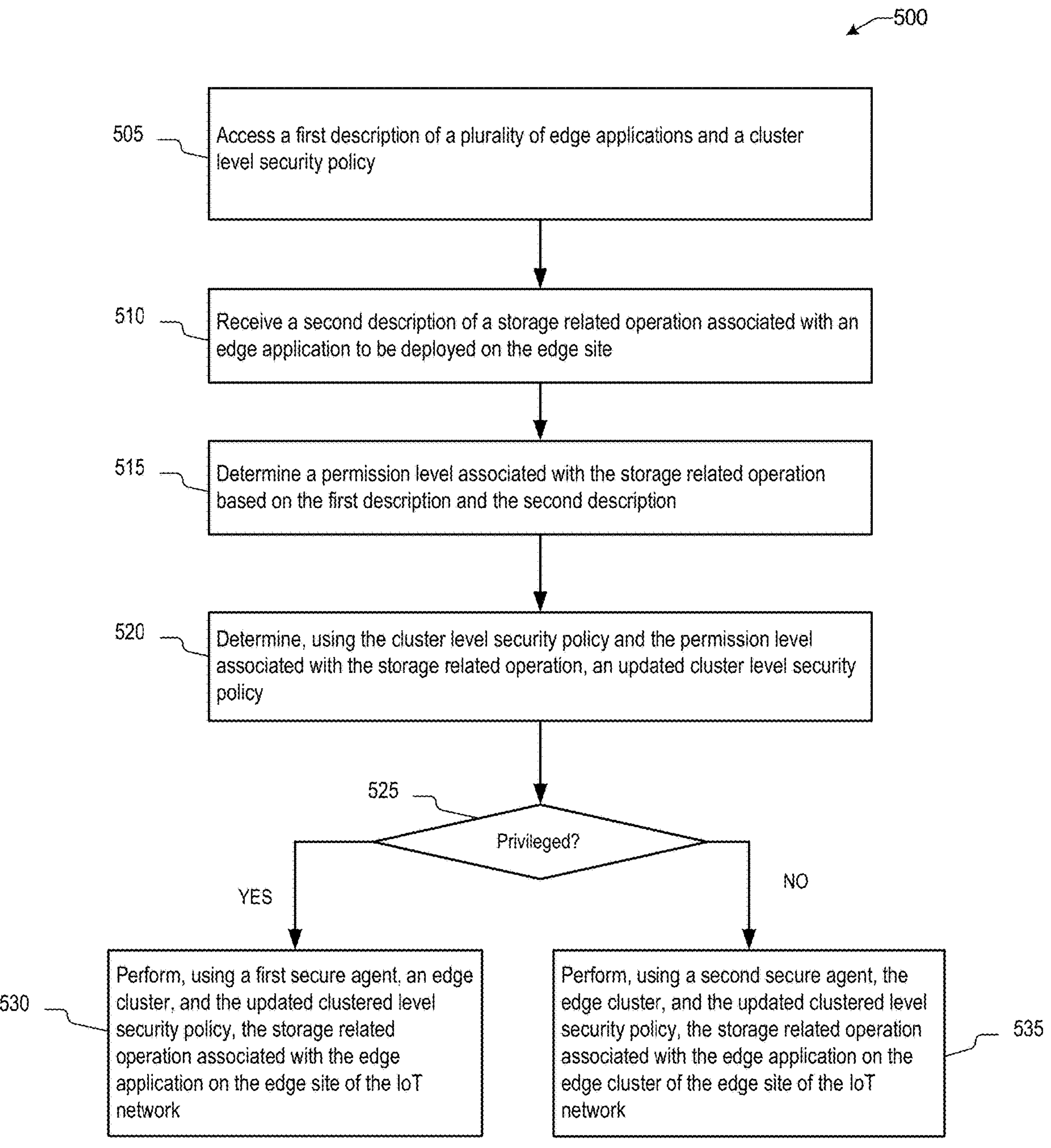
FIG. 5 illustrates an example method for determining a permission level for a storage related privileged operation associated with an edge application.

FIG. 5 illustrates an example method 500 to use application privilege control system 100 (referring to FIG. 1) of IoT control system 400 (referring to FIG. 4) to determine a permission level for a storage related privileged operation associated with an edge application to be deployed on an edge site of an IoT network. The method 500 may begin at step 505 where the edge permission control server 140 may access a first description of a plurality of edge applications and a cluster level security policy. The plurality of edge applications and the cluster level security policy are deployed on an edge site of an IoT network. The plurality of edge operations are associated with one or more applications executed in the edge cluster on the edge site of the IoT network. For example, the first description of the plurality of edge applications includes runtime parameters and metadata to describe one or more privileged Kubernetes® operations. In particular, the first description of the plurality of edge applications is described in a file that extends a classical HELM standard by adding a first metadata section in YAML form. The metadata section contains first information of a plurality of privileged operations associated with the plurality of edge applications. As another example, the cluster level security policy is used by a Kubernetes® cluster to perform a plurality of Kubernetes® operations associated with the plurality of edge applications.

At step 510, the edge permission control server 140 may receive a second description of a storage related operation associated with an edge application to be deployed on the edge site. For example, the second description of the storage related operation associated with the edge application to be deployed on the edge site includes metadata to describe the storage related operation associated with the edge application. In particular, the second description of the storage related operation is described in a file that extends a classical HELM standard by adding a second metadata section in YAML form. The metadata section includes second information of the storage related operation.

At step 515, the edge permission control server 140 may determine a permission level associated with the storage related operation based on the first description and the second description. The edge permission control server 140 may extract the first metadata section to obtain the first information of the plurality of privileged operations associated with the plurality of edge applications. The edge permission control server 140 may extract the second metadata section to obtain the second information of the storage related operation associated with the edge application to be deployed on the edge site. The edge permission control server 140 may analyze the second information based on the first information to determine if the second information contains a description of an authorized privileged operation. When there is an authorized privileged operation in the second information, the edge permission control server 140 may determine a permission level, such as privileged, baseline, or restricted, associated with the storage related operation. When there is something not permitted in the second information, the edge permission control server 140 may return an error.

At step 520, the edge permission control server 140 may use the cluster level security policy and the permission level associated with the storage related operation to determine an updated cluster level security policy. For example, the edge permission control server 140 may update the cluster level security policy with the permission level associated with the storage related operation in the second information. The updated cluster level security policy may be used by the Kubernetes® cluster to perform the storage related operation.

At step 525, the edge permission control server 140 may make a determination whether the storage related operation is a storage related privileged operation. Where the storage related operation is a storage related privileged operation, the process may proceed to step 530 to use a first secure agent, an edge cluster, and the updated clustered level security policy to perform the storage related operation associated with the edge application on the edge site of the IoT network. Where the storage related operation is a not a storage related privileged operation, the process may proceed to step 535 to use a second secure agent, the edge cluster, and the updated clustered level security policy, to perform the storage related operation associated with the edge application on the edge cluster of the edge site of the IoT network.

At step 530, the edge permission control server 140 may use a first secure agent, an edge cluster, and the updated clustered level security policy to perform the storage related operation associated with the edge application on the edge site of the IoT network. In particular, the edge permission control server 140 may extend one or more existing resource types available in the edge cluster of the edge site of the IoT network. For example, the storage related privileged operation is a Linux® OS operation with privileged mechanisms that include Longhorn StorageClass, Persistent Volumes (PV) creation, and PV deletion.

At step 535, the edge permission control server 140 may use a second secure agent, the edge cluster, and the updated clustered level security policy, to perform the storage related operation associated with the edge application on the edge cluster of the edge site of the IoT network.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method to determine a permission level for a storage related privileged operation associated with an edge application to be deployed on an edge site of an IoT network, including the particular steps of the method of FIG. 5, this disclosure contemplates any suitable method including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An apparatus, comprising:

one or more processors;

one or more computer-readable non-transitory storage media comprising instructions that, when executed by the one or more processors, cause one or more components of the apparatus to perform operations comprising:

accessing a first description of a plurality of edge applications and a cluster level security policy, wherein the plurality of edge applications and the cluster level security policy are deployed on an edge site of an Internet of Things (IOT) network, wherein the first description of the plurality of edge applications is described in a first file that extends a first classical standard by adding a first metadata section, the first metadata section comprising first information of a plurality of privileged operations associated with the plurality of edge applications;

receiving a second description of a storage related operation associated with an edge application to be deployed on the edge site, wherein the second description of the storage related operation is described in a second file that extends a second classical standard by adding a second metadata section, the second metadata section comprising second information of the storage related operation;

determining a permission level associated with the storage related operation based on the first description and the second description; and determining, using the cluster level security policy and the permission level associated with the storage related operation, an updated cluster level security policy;

in response to determining the permission level is privileged, performing, using a first secure agent, an edge cluster, and the updated cluster level security policy, the storage related operation associated with the edge application on the edge site of the IoT network.

2. The apparatus of claim 1, wherein the one or more components of the apparatus perform operations further comprising:

in response to determining the permission level is not privileged, performing, using a second secure agent, the edge cluster, and the updated cluster level security policy, the storage related operation associated with the edge application on the edge cluster of the edge site of the IoT network, wherein the second secure agent is a secure agent for non-privileged operations and the second secure agent is different from the first secure agent.

3. The apparatus of claim 1, wherein the first classical standard is a classical HELM standard and the first metadata section is in YAML form.

4. The apparatus of claim 1, wherein the second classical standard is a classical HELM standard and the second metadata section is in YAML form.

5. The apparatus of claim 1, wherein the plurality of edge applications are associated with one or more applications executed in the edge cluster on the edge site of the IoT network.

6. The apparatus of claim 1, wherein the plurality of edge applications are Kubernetes® operations.

7. The apparatus of claim 1, wherein the one or more components of the apparatus perform operations further comprising:

in response to determining the permission level is privileged, extending one or more existing resource types available in the edge cluster of the edge site of the IoT network.

8. The apparatus of claim 7, wherein the one or more existing resource types comprise one or more new storage class types and correlating provisioner configuration.

9. The apparatus of claim 1, wherein the storage related operation is a Linux® OS operation with privileged mechanisms comprising Longhorn StorageClass, Persistent Volumes (PV) creation, and PV deletion.

10. A computer-implemented method, comprising:

accessing a first description of a plurality of edge applications and a cluster level security policy, wherein the plurality of edge applications and the cluster level security policy are deployed on an edge site of an Internet of Things (IOT) network, wherein the first description of the plurality of edge applications is described in a first file that extends a first classical standard by adding a first metadata section, the first metadata section comprising first information of a plurality of privileged operations associated with the plurality of edge applications;

receiving a second description of a storage related operation associated with an edge application to be deployed on the edge site, wherein the second description of the storage related operation is described in a second file that extends a second classical standard by adding a second metadata section, the second metadata section comprising second information of the storage related operation;

determining a permission level associated with the storage related operation based on the first description and the second description;

determining, using the cluster level security policy and the permission level associated with the storage related operation, an updated cluster level security policy; and in response to determining the permission level is privileged, performing, using a first secure agent, an edge cluster, and the updated cluster level security policy, the storage related operation associated with the edge application on the edge site of the IoT network.

11. The computer-implemented method of claim 10, further comprising:

in response to determining the permission level is not privileged, performing, using a second secure agent, the edge cluster, and the updated cluster level security policy, the storage related operation associated with the edge application on the edge cluster of the edge site of the IoT network, wherein the second secure agent is a secure agent for non-privileged operations and the second secure agent is different from the first secure agent.

12. The computer-implemented method of claim 10, wherein the first classical standard is a classical HELM standard and the first metadata section is in YAML form.

13. The computer-implemented method of claim 10, wherein the second classical standard is a classical HELM standard and the second metadata section is in YAML form.

14. The computer-implemented method of claim 10, wherein the plurality of edge applications are associated with one or more applications executed in the edge cluster on the edge site of the IoT network.

15. The computer-implemented method of claim 10, wherein the plurality of edge applications are Kubernetes® operations.

16. The computer-implemented method of claim 10, further comprising:

in response to determining the permission level is privileged, extending one or more existing resource types available in the edge cluster of the edge site of the IoT network.

17. The computer-implemented method of claim 16, wherein the one or more existing resource types include one or more new storage class types and correlating provisioner configuration.

18. The computer-implemented method of claim 10, wherein the storage related operation is a Linux® OS operation with privileged mechanisms that include Longhorn StorageClass, Persistent Volumes (PV) creation, and PV deletion.

19. A non-transitory computer-readable medium comprising instructions that are configured, when executed by a processor, to:

access a first description of a plurality of edge applications and a cluster level security policy, wherein the plurality of edge applications and the cluster level security policy are deployed on an edge site of an Internet of Things (IOT) network, wherein the first description of the plurality of edge applications is described in a first file that extends a first classical standard by adding a first metadata section, the first metadata section comprising first information of a plurality of privileged operations associated with the plurality of edge applications;

receive a second description of a storage related operation associated with an edge application to be deployed on the edge site, wherein the second description of the storage related operation is described in a second file that extends a second classical standard by adding a second metadata section, the second metadata section comprising second information of the storage related operation;

determine a permission level associated with the storage related operation based on the first description and the second description;

determine, using the cluster level security policy and the permission level associated with the storage related operation, an updated cluster level security policy; and in response to determining the permission level is privileged, perform, using a first secure agent, an edge cluster, and the updated cluster level security policy, the storage related operation associated with the edge application on the edge site of the IoT network.

20. The non-transitory computer-readable medium of claim 19, wherein:

wherein the first classical standard is a classical HELM standard and the first metadata section is in YAML form, and the second classical standard is a classical HELM standard and the second metadata section is in YAML form.

* * * * *